(No Model.)

J. R. WILLIAMS.

COMBINED CIGAR ROLLING TABLE AND WRAPPER CUTTER.

No. 335,263. Patented Feb. 2, 1886.

Attest.
L. Lee.
H. J. Theberath

Inventor.
John R. Williams.
per Thos. S. Crane, Atty.

UNITED STATES PATENT OFFICE.

JOHN R. WILLIAMS, OF NEWARK, NEW JERSEY.

COMBINED CIGAR-ROLLING TABLE AND WRAPPER-CUTTER.

SPECIFICATION forming part of Letters Patent No. 335,263, dated February 2, 1886.

Application filed March 8, 1884. Serial No. 122,501. (No model.)

*To all whom it may concern:*

Be it known that I, JOHN R. WILLIAMS, a citizen of the United States, residing in Newark, Essex county, New Jersey, have invented certain new and useful Improvements in a Combined Cigar-Rolling Table and Wrapper-Cutter, fully described and represented in the following specification and the accompanying drawings, forming a part of the same.

The invention relates to a combined cigar-rolling table and wrapper-cutter; and it consists of a cigar-maker's rolling-table having a slit or opening through which a cutter may be projected to sever a cigar-wrapper from the tobacco-leaf, in combination with a cutter fitted to said slit or opening, means for sustaining that portion of the table within the cutting-edge on a level with the surface outside of the cutting-edge, and means for moving the table or cutter in such relation to each other that the operator may change the adjustment of the cutter and table, so as to project the cutter above the surface of the table at will, for the purpose of severing a wrapper from the leaf, after which the cutter may be returned to its former position and a "bunch" rolled in the wrapper thus cut.

Figure 1:
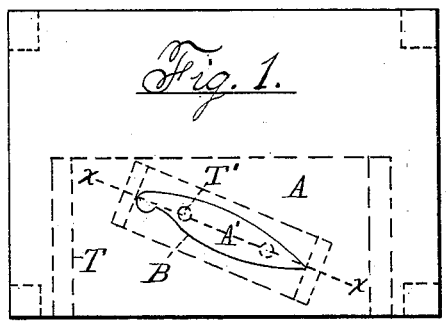
Figure 4:
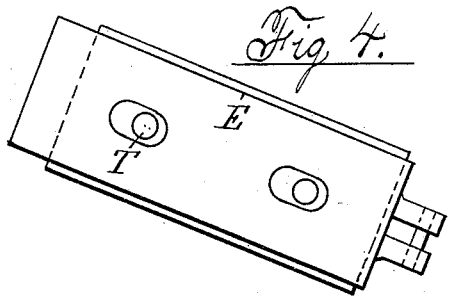
Figure 2:
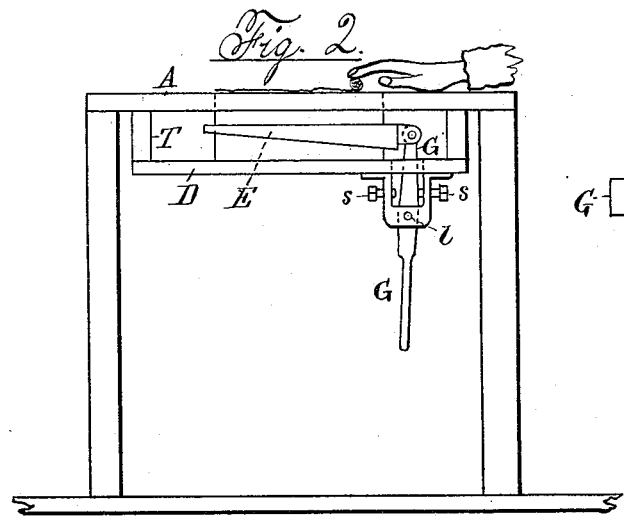
Figure 5:
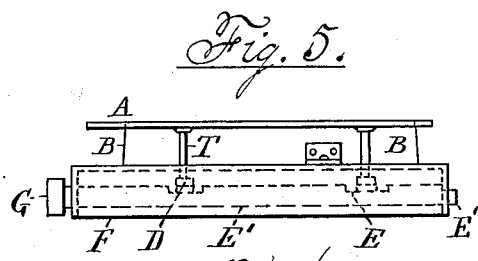
Figure 6:
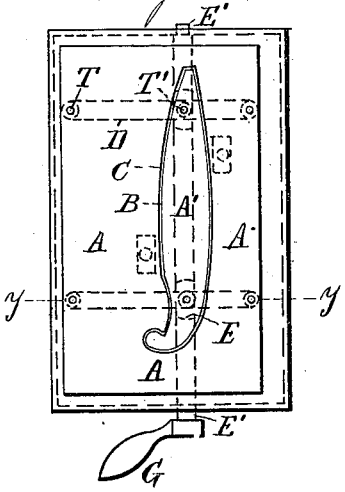
Figure 3:
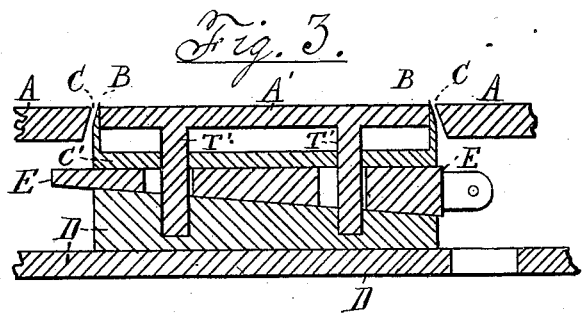
Figure 7:
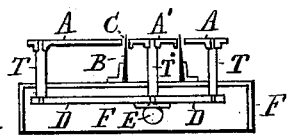

Two equivalent constructions of my invention are shown in the drawings, Figure 1 being a plan, and Fig. 2 a front elevation, of a table provided with one form of my improvement. Fig. 3 is a section of the cutter and its elevating mechanism enlarged, taken on line $x$ $x$ of Fig. 1; and Fig. 4 is a plan of the elevator-bed and wedge. Figs. 5 and 6 are respectively a side elevation and a plan of the other construction, in which the cutter is stationary and the table movable; and Fig. 7 is a section on the line $y$ $y$ of Fig. 6.

A denotes the table outside of the cutter; B, the cutter; C, the slit through which the edge of the cutter projects above the surface of the table when in use; and A' the table within the slit C, the continuous character of the cutting-edge entirely severing such inner part of the table from the outside of the slit, and thus necessitating some common support, D, for both parts of the table at a point beneath the cutter.

The support D is a bed connected with the table outside of the cutter by the ties or standards T, and inside of the cutter by the ties or standards T'. The cutter may be projected above the surface of the table either by fixing the latter and lifting the cutter or by fixing the cutter and making the table movable. In either case mechanism is necessary for adjusting the cutter and table in the different positions required for cutting and rolling the cigar-wrapper.

Two different mechanisms (a cam and wedge) are shown herein for effecting, respectively, the movement of the table and the cutter; but either mechanism might, with suitable changes in the other parts, be used for moving either the cutter or the table.

The means for raising and lowering the cutter is shown in Figs. 1 to 4 as a wedge, E, interposed between the bed and the cutter, so that the cutter may be raised at pleasure through the slit in the table.

The internal platen or table A' may, for convenience, be called the "central" table, and that part of the table outside of the cutter (or slit C) the "lateral" table.

Figs. 5 to 7, inclusive, show the adjusting means as a rotating cam, E, formed on a shaft, E', which is journaled in a frame, F, beneath the bed D. In either construction the cutter may be retracted from the slit, so as to leave a smooth level surface upon the top of the table, as shown in Figs. 2 and 5, so that the tobacco-leaf may be spread over the slit in readiness to be cut, the operator being distinctly guided by the slit as to the application of the leaf to the cutter. The adjusting means is then operated and the cutter is made to project slightly above the surface of the table, and the leaf is pressed against the cutter by any suitable means and the wrapper severed therefrom. Without moving the wrapper from the table the cutter is then retracted and the cigar-bunch applied to the wrapper and rolled therein upon the place where it was first cut. The leaf may be pressed upon the cutter by a roller or other suitable means.

In Fig. 2 I have shown the cigar-bunch partially rolled upon a wrapper and the hand of the operator resting upon the table A outside of the slit C in the position natural in such an operation. It will be seen that the ball of the thumb requires a support to avoid too great a pressure upon the cigar, and that the parts of the table inside and outside of the slit co-operate in sustaining the cigar and the hand of the operator during the rolling operation. From this function arises the necessity of tying the parts A and A' together beneath the cutter, as no obstruction can be placed above the surface of the table or extended across the slit C.

In Figs. 1 to 4, in which the cutter is movable, the inner table, A, is mounted upon two ties or standards, T', which are rigidly supported upon a bed, D, which latter is affixed to the table A by two ties, T. Upon the bed is provided an inclined surface, serving as a seat for a wedge, E, which is moved at pleasure by a lever, G, extended beneath the table within reach of the operator's knee. The cutter rests directly upon the wedge, so as to slide up and down when the wedge is moved longitudinally upon its seat. The lever G is hinged to a bracket at $l$, and is provided with stops or set-screws $s$ $s$, to regulate the throw of the wedge and cutter. By this means the cutter can be instantly raised or lowered, as desired.

In Figs. 5 to 7 a frame, F, of box-like character, sustains the cam-shaft E' a little below its top plate, and the ties T and T' all penetrate the said plate, and are joined to a bed, D, formed of two transverse bars, each carrying a tie, T, at its outer end and one of the ties T' near its middle. The ties are affixed in the parts A and A', so that the latter are held at the same level, and the two bars of the bed rest upon eccentric or cam-like surfaces E, formed on the shaft E', a hand-lever, G, being secured to the end of the shaft to rotate it, and to thus raise the table-surfaces A and A' simultaneously.

By either of the means described the cigar-wrapper can be cut and applied to the bunch without removal from the table, and consequently without the damage occasioned by handling. The wrappers are thus preserved from tearing and wrinkling, and are furnished to the cigar-roller in a moist and pliable condition, and all necessity for "booking" a previously-cut wrapper is avoided.

As the rolling operation requires a level surface, the necessity of tying together the parts of the table within and without the slit C is apparent, and my construction therefore differs in the following respects from the spring-moved platens sometimes used as ejectors with cutting-dies. Such platens have no function except to raise the cut blank into a position suited for sliding it laterally away from the cutting-edge, and have therefore no motion except that forced upon them by the pressure of the material upon such platens when the material is forced against the cutting-edge to sever the blank therefrom.

In my construction the lateral table is not on a level with the cutting-edge during the cutting operation, as in machines using a spring-moved platen within the cutter and a fixed table outside, and instead of either the central or lateral table pressing upon the material at any time, or being moved by the material or the pressing agent, it is moved by positive mechanism, and is held and retained positively in given positions independently of the cutting agency.

What I claim as my invention, and desire to secure by Letters Patent, is—

In a device for cutting cigar-wrappers, the combination of the cutter, the lateral table external to the cutter, the stationary central table or platen located in the same plane as the lateral table, and the mechanism, substantially as described, for adjusting the cutter, as and for the purpose set forth.

In testimony whereof I have hereunto set my hand in the presence of two subscribing witnesses.

JNO. R. WILLIAMS.

Witnesses:
 THOS. S. CRANE,
 A. VAN ARSDALE.